United States Patent
Kusuda

(10) Patent No.: US 7,295,237 B2
(45) Date of Patent: Nov. 13, 2007

(54) IMAGE CAPTURING APPARATUS CAPABLE OF EXTRACTING A MOVING OBJECT

(75) Inventor: Masayuki Kusuda, Nishinomiya (JP)

(73) Assignee: Konica Minolta Holdings, Inc., Tokyo (JP)

( * ) Notice: Subject to any disclaimer, the term of this patent is extended or adjusted under 35 U.S.C. 154(b) by 824 days.

(21) Appl. No.: 10/719,312

(22) Filed: Nov. 21, 2003

(65) Prior Publication Data
US 2005/0012838 A1    Jan. 20, 2005

(30) Foreign Application Priority Data
Jul. 18, 2003    (JP) .............................. 2003-198956

(51) Int. Cl.
*H04N 5/335*    (2006.01)
(52) U.S. Cl. .................... 348/308; 348/297; 348/302
(58) Field of Classification Search ................ 348/297, 348/310, 222.1, 302, 308; 250/208.1, 214.1, 250/214 L
See application file for complete search history.

(56) References Cited

U.S. PATENT DOCUMENTS

| | | | |
|---|---|---|---|
| 4,973,833 A * | 11/1990 | Takada et al. ............ | 250/208.1 |
| 5,241,575 A | 8/1993 | Miyatake et al. ............. | 377/60 |
| 5,289,286 A * | 2/1994 | Nakamura et al. ........ | 348/223.1 |
| 5,526,058 A * | 6/1996 | Sano et al. .................. | 348/647 |
| 5,602,585 A * | 2/1997 | Dickinson et al. .......... | 348/155 |
| 5,606,376 A | 2/1997 | Shinohara .................... | 348/701 |
| 6,624,849 B1 * | 9/2003 | Nomura ....................... | 348/241 |
| 6,867,409 B2 * | 3/2005 | Kusuda et al. ........... | 250/208.1 |
| 7,009,649 B2 * | 3/2006 | Watanabe .................... | 348/308 |
| 7,190,399 B2 * | 3/2007 | Kakumoto ................... | 348/308 |

FOREIGN PATENT DOCUMENTS

| | | |
|---|---|---|
| JP | 5-145823 A | 11/1993 |
| JP | 2001-036817 A | 2/2001 |
| JP | 2001-223948 A | 8/2001 |

* cited by examiner

*Primary Examiner*—David Ometz
*Assistant Examiner*—Tuan Le
(74) *Attorney, Agent, or Firm*—Sidley Austin LLP

(57) ABSTRACT

An image capturing apparatus comprises a solid image pickup element having pixels for outputting signals, which are logarithmically varied with respect to an incident light intensity, and a voltage controller. Each of the pixels includes an photoelectric conversion element, and a MOS transistor for logarithmic transformation, in which an output from the photoelectric conversion element is input into a drain. The voltage controller can apply, to a source, a reset voltage for resetting the transistor in such a manner that the photoelectric conversion element is operated in a moving object extraction image pickup mode. Furthermore, the voltage controller applies, to the source, the reset voltage for resetting the transistor to a level selected from a plurality of reset levels for moving object extraction image pickup.

21 Claims, 12 Drawing Sheets

(A)

(B)

Fig.6
(A)
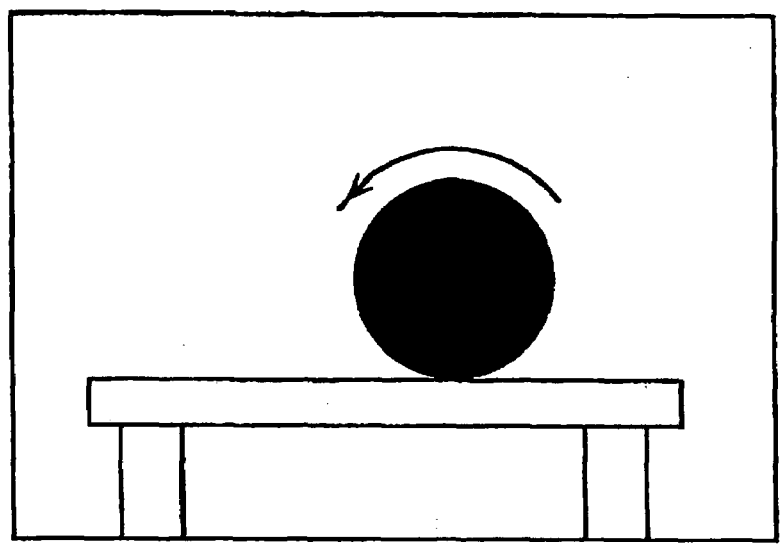
(B)
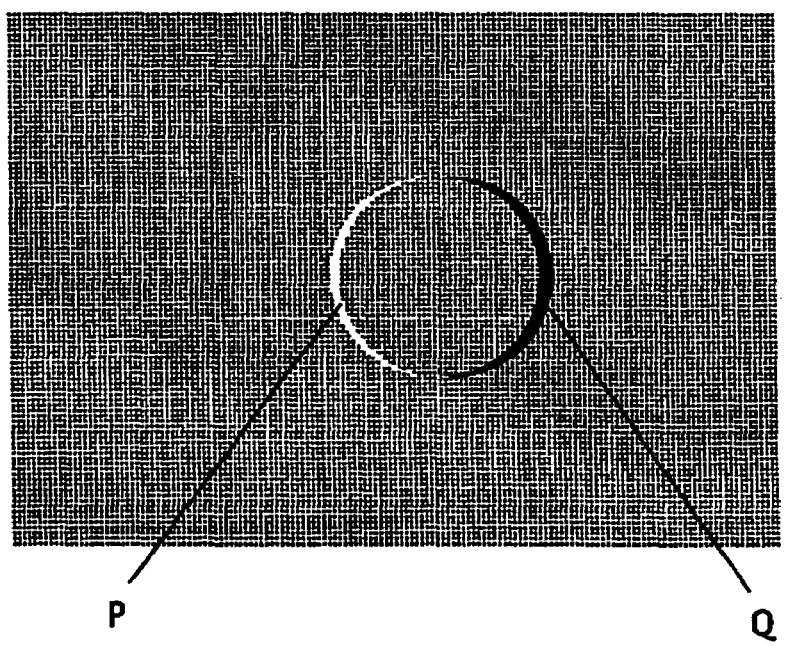
P          Q

Fig.10
(A)
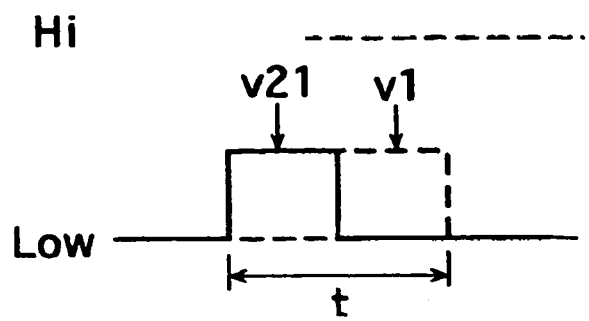
(B)
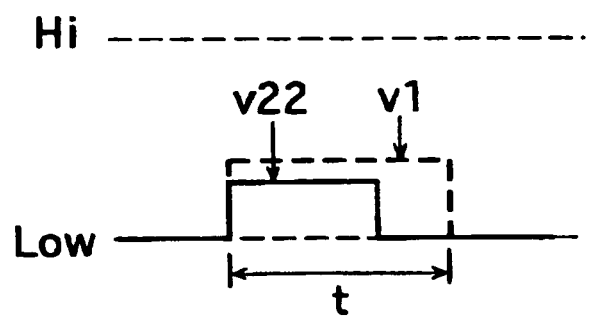
(C)
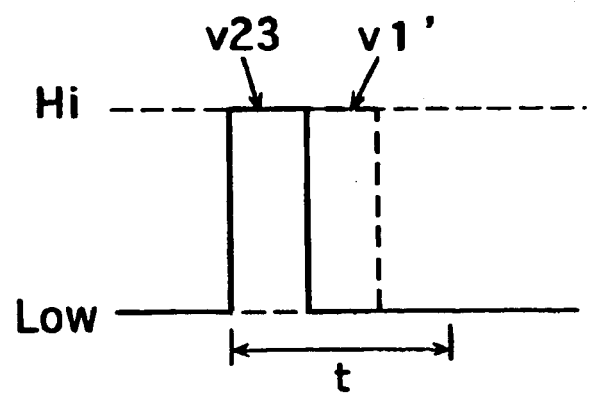

Fig.12
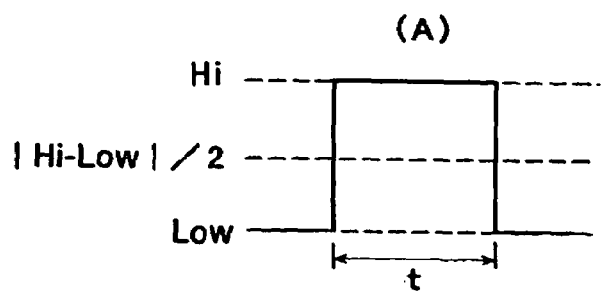
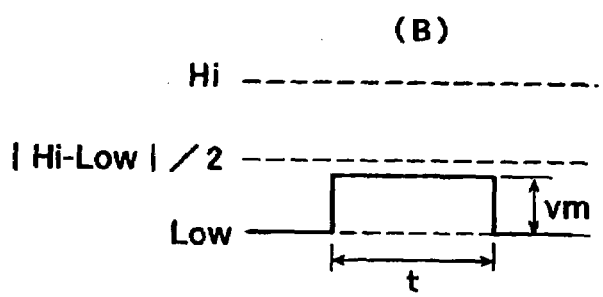
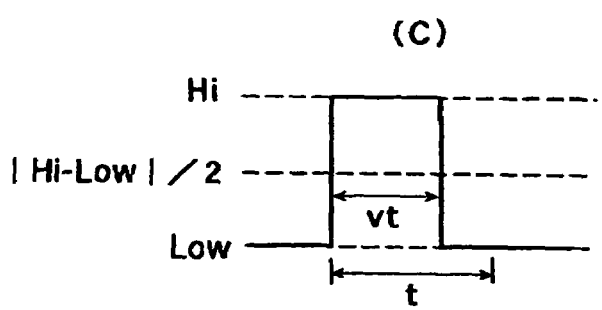
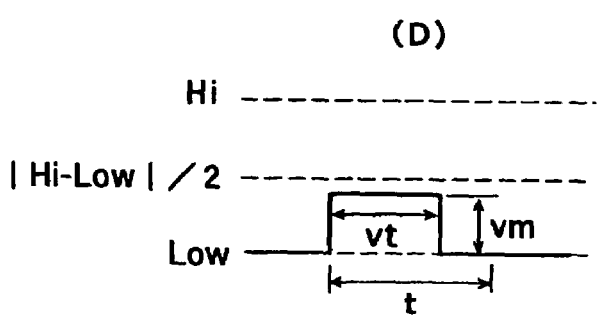

IMAGE CAPTURING APPARATUS CAPABLE OF EXTRACTING A MOVING OBJECT

This application is based on the application No. 2003-198956 filed in Japan, the contents of which are hereby incorporated by reference.

BACKGROUND OF THE INVENTION

1. Field of the Invention

The present invention relates to an image capturing apparatus capable of extracting a moving object and picking it up, and a method for adjusting the image capturing apparatus.

2. Description of the Related Art

In an image pickup field, there has been studied the detection of a moving object in order to monitor, for example, an illegal intruder. Conventional moving object detecting technique typically includes an inter-frame difference method (for example, a method for taking a difference between different frames such as a previous screen and a current screen) or a background difference method (for example, a method for taking a difference between a background image and an input image). The inter-frame difference method is disclosed in, for example, Japanese Patent Application Laid-open No. 05-145823, and further, the background difference method is disclosed in, for example, U.S. Pat. No. 5,606,376.

In the meantime, there have been proposed various image capturing apparatuses per se. In particular, with respect to the width of a dynamic range, Japanese Patent Application Laid-open No. 2001-36817, for example, discloses an image capturing apparatus having a wide dynamic range, comprising a solid image pickup element including a photosensitive element for generating an electric signal according to an incident light intensity in a picking-up pixel and a transistor for logarithmic transformation, for converting the incident light intensity to the photosensitive element in a naturally logarithmic manner so as to output it.

In this image capturing apparatus, the transistor for logarithmic transformation includes a control electrode, a first electrode and a second electrode, wherein an output from the photosensitive element is input into the first electrode in the transistor for logarithmic transformation. An image of an object can be picked up by applying a first voltage to the second electrode in the transistor for logarithmic transformation. Thereafter, a second voltage is applied to the second electrode in the transistor for logarithmic transformation, and then, a current greater than that before the application of the second voltage is made to flow in the transistor for logarithmic transformation, so that the transistor is reset.

Here, as for the detection of the moving object, the conventional inter-frame difference method or background difference method requires the complicated processing of a signal from the image pickup element, and therefore, the burden of the signal processing is large in an image pickup system.

In view of the above-described problems observed in the prior art, an object of the present invention is to provide an image capturing apparatus capable of easy detection of the existence of a moving object without requiring any complicated signal processing and capable of moving object extraction image pickup in an image pickup region over a wide luminance range.

Furthermore, another object of the present invention is to provide a method for adjusting such an image capturing apparatus in the mode in which the moving object extraction image pickup can be achieved.

SUMMARY OF THE INVENTION

In order to achieve the above-described objects, an image capturing apparatus according to the present invention, comprises: a solid image pickup element including a photosensitive element and a transistor for logarithmic transformation, in which an output signal from the photosensitive element is input into a first electrode, for outputting a signal, which is logarithmically varied with respect to an incident light intensity to the photosensitive element; and a voltage controller for controlling a voltage to be applied to a second electrode of the transistor, wherein the voltage controller applies a first reset voltage to the second electrode, so as to reset the transistor in such a manner that the image capturing apparatus is operated in a state of moving object extraction image pickup, and wherein the first reset voltage is a voltage for resetting the transistor in one reset level selected from a plurality of reset levels of the transistor.

In this image capturing apparatus, the reset voltage for resetting the transistor for logarithmic transformation is applied to the second electrode in such a manner that the solid image pickup element is operated in the state of the moving object extraction image pickup under the voltage application control by the voltage controller, thereby generating pickup data for darkly or brightly displaying at least a part of a moving object which provides variations in luminance in an image pickup region (i.e., an object) in the image capturing apparatus with respect to a background image of a uniform density. Consequently, the moving object is extracted without requiring any complicated signal processing or image processing, and thus, the existence of the moving object can be detected.

Furthermore, an adjusting method for an image capturing apparatus provided with a solid image pickup element having pixels, including a photosensitive element and a transistor for receiving an output signal from the photosensitive element and outputting a signal, comprises the steps of: calculating a reset condition of the transistor in order to achieve a moving object extraction image pickup at a luminance higher than an upper limit value within an assumed object luminance range; and resetting the transistor in the calculated reset condition.

Here, "the upper limit value within the assumed object luminance range" signifies an upper limit value within a typical object luminance range, which has been generally known, or an upper limit value slightly higher than the upper limit value. Otherwise, the luminance ranges of various kinds of objects have been measured in advance by experiments or the like, and then, an upper limit value according to the object may be adopted. Or, a predetermined upper limit value may be adopted according to the usage, using region and using environment of the image capturing apparatus.

In the following description, like parts are designated by like reference numbers throughout the several drawings.

BRIEF DESCRIPTION OF THE DRAWINGS

FIG. 6(A) is a diagram illustrating an image pickup example of an object in the normal image pickup mode, and FIG. 6(B) is a diagram illustrating an image pickup example of an object in the moving object extraction image pickup mode;

FIG. 10(A) to 10(C) are timing charts illustrating other examples of a reset voltage with respect to a transistor for logarithmic transformation in order to achieve moving object extraction image pickup, respectively;

FIG. 12(A) is a timing chart illustrating the reset voltage in the normal image pickup mode, and FIGS. 12(B) to 12(D) are timing charts illustrating adjustment of the reset voltage with respect to the transistor for logarithmic transformation in order to achieve the moving body extraction image pickup, respectively.

DETAILED DESCRIPTION OF THE PREFERRED EMBODIMENTS

Preferred embodiments according to the present invention will be described below in reference to the accompanying drawings.

(1) Image Capturing Apparatus A

Figure 1:
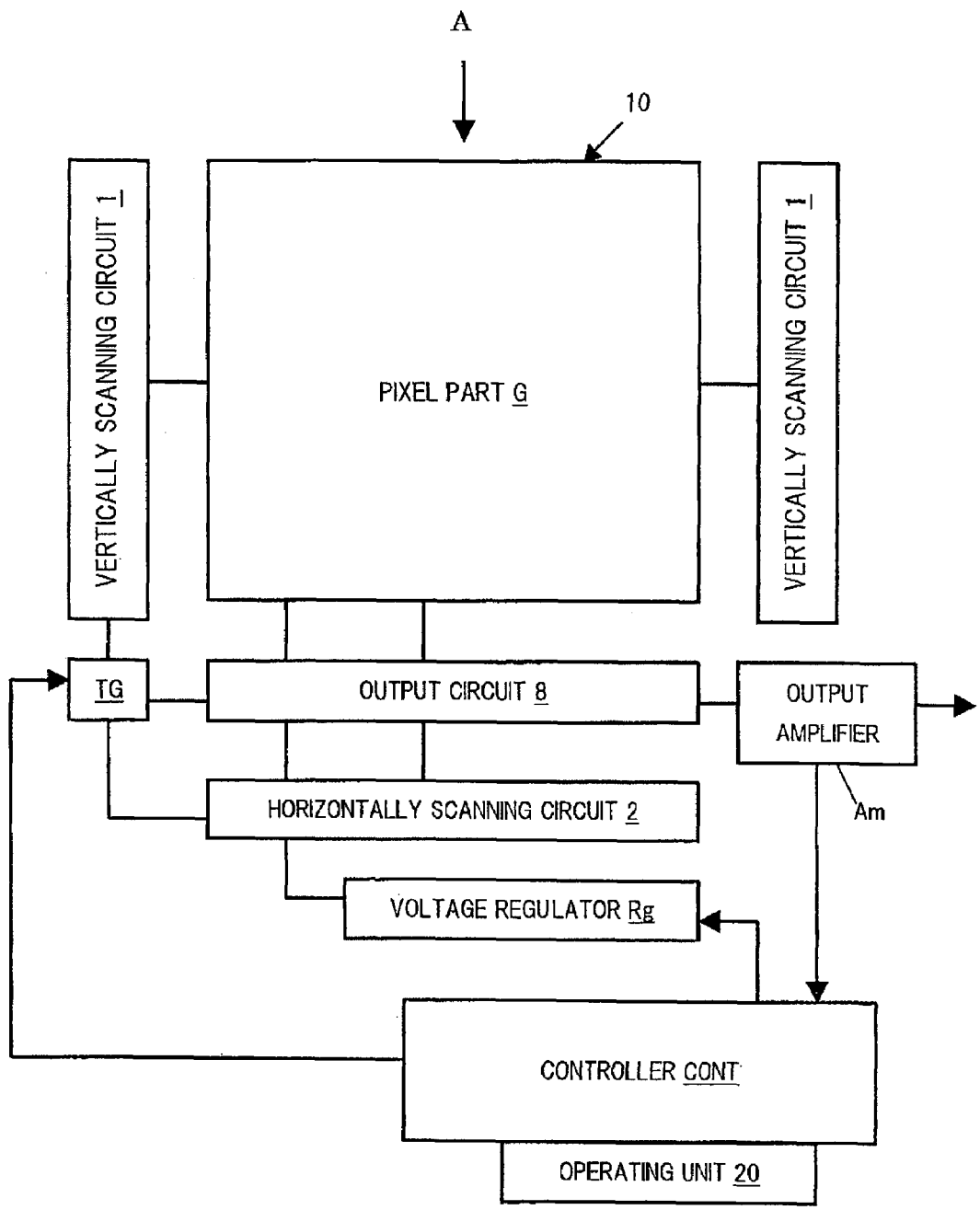
FIG. 1 is a block diagram illustrating the configuration of an image capturing apparatus in a preferred embodiment.
Figure 2:
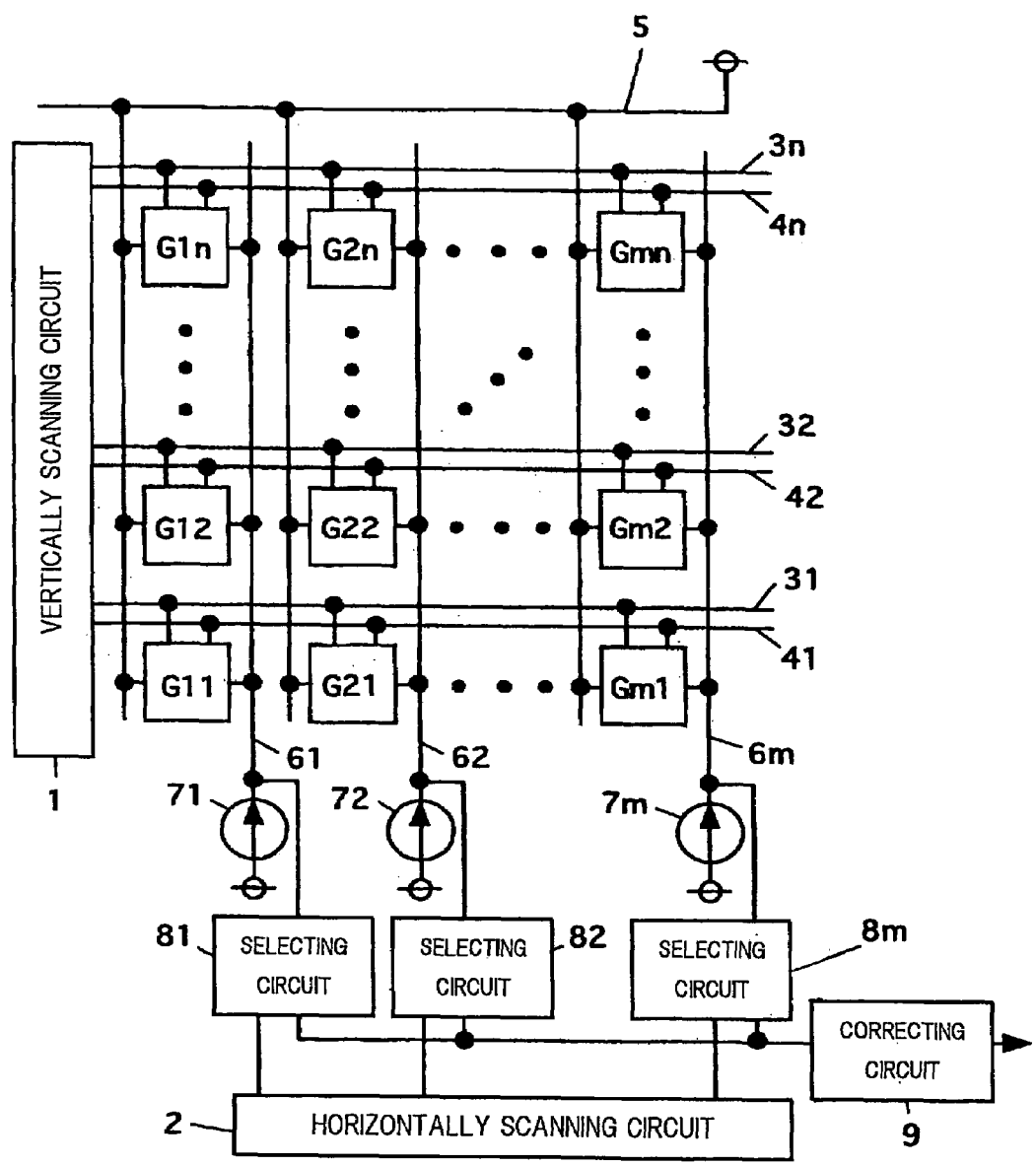
FIG. 2 is a diagram illustrating the configuration of a pixel portion or the like having pixels arrayed therein in an image pickup element in the image capturing apparatus illustrated in FIG. 1.
Figure 3:
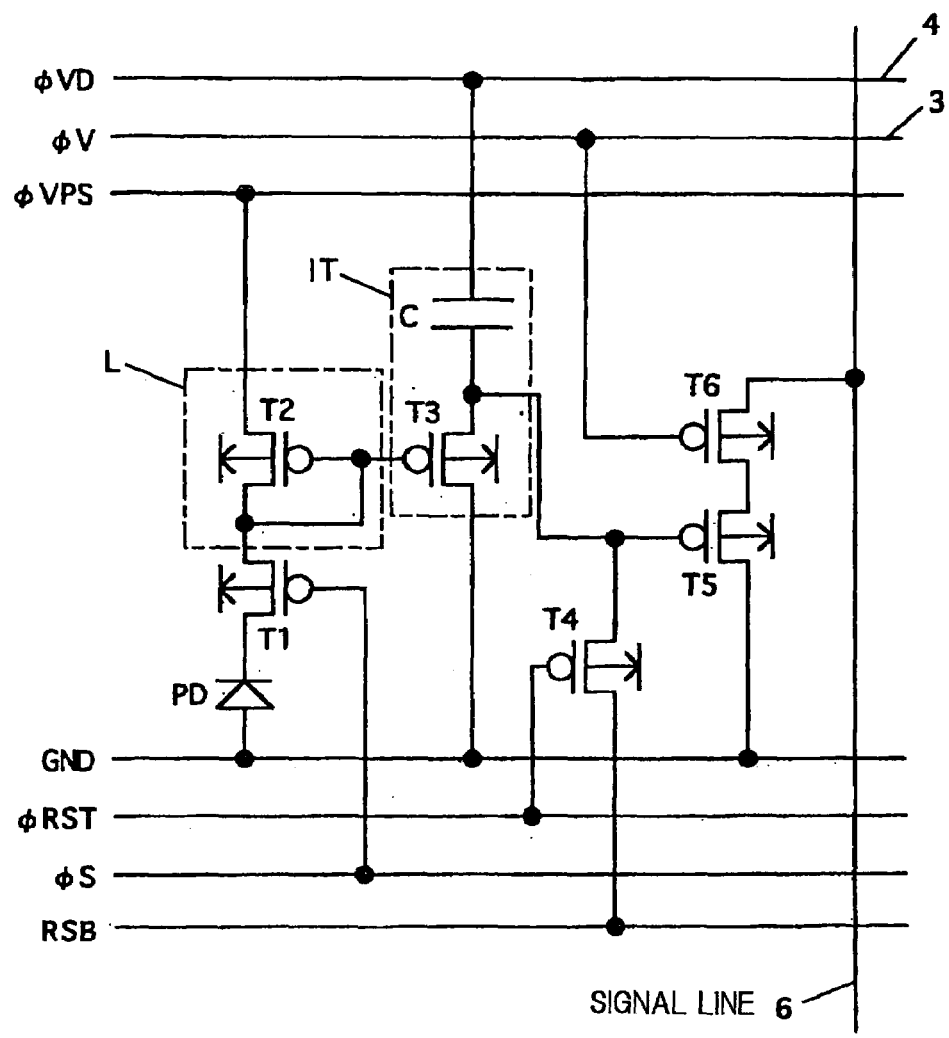
FIG. 3 is a diagram illustrating the configuration of one pixel.
Figure 4:
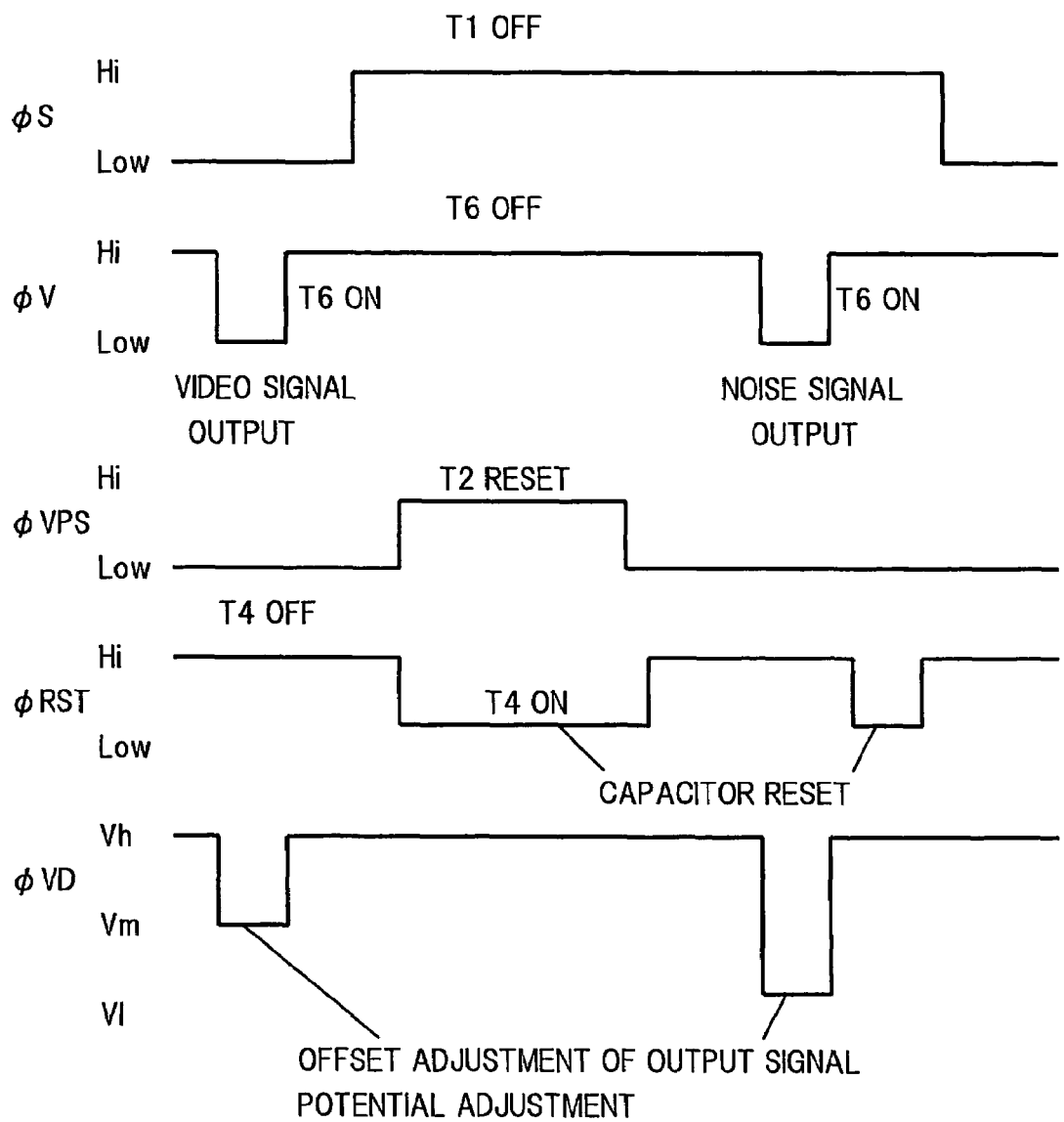
FIG. 4 is a timing chart illustrating the state of application of a drive voltage to the image pickup element in a normal image pickup state (i.e., a normal image pickup mode) in the image pickup element illustrated in FIGS. 1 to 3.
Figure 5:
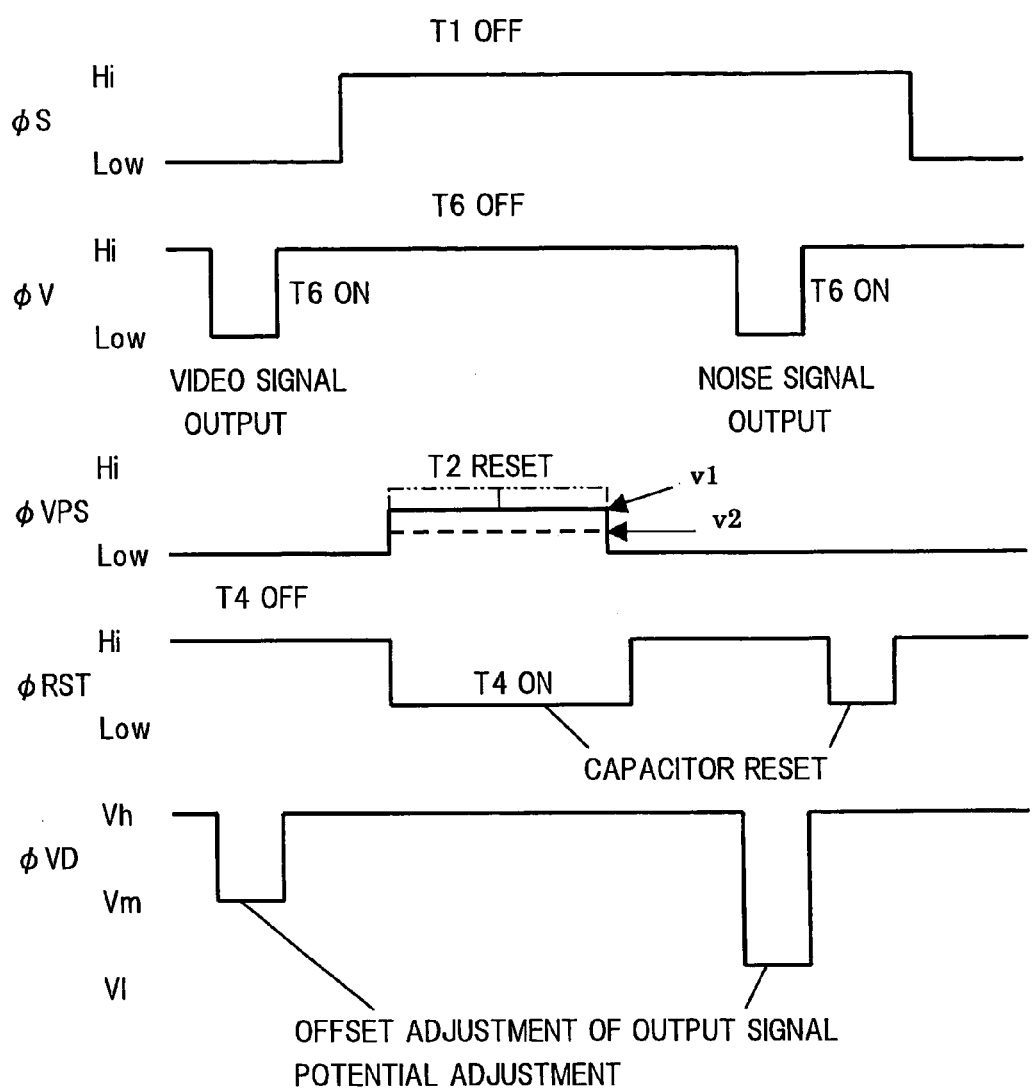
FIG. 5 is a timing chart illustrating the state of application of a drive voltage to the image pickup element in a moving object extraction image pickup state (i.e., a moving object extraction image pickup mode) in the image pickup element illustrated in FIGS. 1 to 3.

FIG. 1 is a block diagram illustrating an image capturing apparatus in a preferred embodiment. An image capturing apparatus A illustrated in FIG. 1 comprises a solid image pickup element 10, a voltage regulator Rg and a controller CONT constituted of mainly a computer. FIG. 2 is a diagram illustrating the configuration of a pixel portion or the like having pixels arrayed therein in the solid image pickup element 10. FIG. 3 is a diagram illustrating the configuration of one pixel. FIG. 4 is a timing chart illustrating the application of a drive voltage when a normal image pickup mode is achieved. FIG. 5 is a timing chart illustrating the application of a drive voltage when a moving object extraction image pickup mode is achieved.

The solid image pickup element 10 is provided with a plurality of pixels and an output circuit. Each of the plurality of pixels includes an photoelectric conversion element serving as a photosensitive element, a logarithmic transformation circuit including a transistor for logarithmic transformation for transforming an output from the photoelectric conversion element into an electric signal in proportion to a logarithmic value of an incident light intensity to the photoelectric conversion element, and an integrator circuit for accumulating an output from the logarithmic transformation circuit. The output circuit receives a signal from each of the pixels, and then, outputs it.

Explanation will be made below in reference to the accompanying drawings. The solid image pickup element 10 is provided with a pixel portion G, vertically scanning circuits 1 and an output circuit 8, which are connected to the pixel portion G, as illustrated in FIG. 1. To the output circuit 8 are connected a horizontally scanning circuit 2 and an output amplifier Am. Image data is output from the output amplifier Am. The output from the output amplifier Am is input also into the controller CONT, as described later.

To the solid image pickup element 10 is connected a timing generator TG, which actuates each of component parts at a predetermined timing based on an instruction given from the controller CONT. Furthermore, the timing generator TG controls an applying period of various kinds of applying voltages to the pixels based on an instruction given from the controller CONT.

The voltage regulator Rg supplies predetermined various kinds of voltage signals or the like to the pixel portion G or the like based on an instruction given from the controller CONT. Moreover, the voltage regulator Rg controls also voltage values of the various kinds of applying voltages to the pixels based on an instruction given from the controller CONT.

An operating unit 20 includes an operating member to be operated by a user, and is adapted to instruct switching or the like of the image pickup modes by the user.

As illustrated in FIG. 2, image pickup pixels G11 to Gmn are arrayed in a matrix (i.e., a matrix array) in the pixel portion G in the solid image pickup element 10. The vertically scanning circuit 1 sequentially scans row lines 31, 32, . . . and 3n, each of which gives a scanning signal ØV to each of the pixels, and further, supplies a voltage ØVD to a capacitor C, described later, of each of the pixels via lines 41, 42, . . . and 4n.

The horizontally scanning circuit 2 sequentially reads a photoelectric conversion signal introduced-out via output signal lines 61, 62, . . . and 6m from each of the pixels in a horizontal direction per pixel. In FIG. 2, reference numeral 5 designates a power source line.

Incidentally, reference numeral 3 designates a row line; 4, the ØVD supply line; and 6, the output signal line in FIG. 3, described later.

To each of the pixels are connected not only the lines 31, 32, . . . and 3n, 41, 42, . . . and 4n, the output signal lines 61, 62, . . . 6m, and the power source line 5 but also other lines (for example, a clock line, a bias supply line and the like), which are omitted in FIG. 2.

The output circuit 8 illustrated in FIG. 1 includes constant current sources 71, 72, . . . and 7m, selecting circuits 81, 82, . . . and 8m, and a correcting circuit 9 illustrated in FIG. 2.

The constant current sources 71, 72, . . . and 7m are connected to the output signal lines 61, 62, . . . 6m, respectively. The selecting circuits 81, 82, . . . and 8m are circuits for sample-holding a video signal and a noise signal which are given from the pixels G11 to Gmn via the signal lines 61 to 6m. The correcting circuit 9 performs the correction processing, that is, the processing of subtracting a difference between a video signal and a noise signal from the video signal when the video signal and the noise signal are sent in sequence from the selecting circuits 81, 82, . . . and 8m, and then, outputs the video signal, from which a noise is eliminated, to the outside. Here, a DC voltage VPS is applied to one end of each of the constant current sources 71 to 7m.

In the above-described solid image pickup element 10, each of the video signal and the noise signal as outputs from a pixel Gab (wherein a is a natural number where $1 \leq a \leq m$, and b is a natural number where $1 \leq b \leq n$) is output via an output signal line 6a, and is amplified by a constant current source 7a connected to the output signal line 6a. The video signal and the noise signal output from the pixel Gab are sent in sequence to a selecting circuit 8a. Furthermore, the selecting circuit 8a sample-holds the video signal and the noise signal. Thereafter, from the selecting circuit 8a, the sample-held video signal is sent to the correcting circuit 9, and further, the sample-held noise signal is sent to the correcting circuit 9.

The correcting circuit 9 subjects the video signal given by the selecting circuit 8a to the correction processing based on the noise signal given by the selecting circuit 8a, and further, amplifies the video signal, from which the noise is eliminated, by the output amplifier Am, and then, outputs it to the outside. The configuration of each of the selecting circuits 81 to 8m and the correcting circuit 9 is exemplified by the configuration disclosed in the Japanese Patent Application Laid-open No. 2001-223948 filed by the present applicants. Incidentally, the selecting circuits 81 to 8m may include the correcting circuit 9.

Next, one example of the pixels G11 to Gmn will be explained below in reference to FIG. 3.

The pixel illustrated in FIG. 3 comprises a photodiode PD as one example of the photoelectric conversion element, a logarithmic transformation circuit L including a MOS transistor T2 for logarithmic transformation for transforming an output from the photodiode PD into an electric signal in proportion to a logarithmic value of an incident light intensity to the photodiode PD, and an integrator circuit IT including the capacitor C for accumulating the outputs from the logarithmic transformation circuit L.

Further explanation will be made below. In each of the pixels, a drain of a switching MOS transistor T1 is connected to a cathode of the photodiode PD having an anode grounded. To a source of the transistor T1 are connected a gate and a drain of the MOS transistor T2 for logarithmic transformation and a gate of a MOS transistor T3. The transistor T3 is adapted to allow a current equivalent to a logarithmically transformed signal to flow therein.

Moreover, a source of the MOS transistor T3 is connected to a gate of a MOS transistor T5 for source follower amplification and a drain of a MOS transistor T4 for resetting a capacitor. To a source of the MOS transistor T5 is connected a drain of a MOS transistor T6 for switching (i.e., for reading a signal). Additionally, a source of the MOS transistor T6 is connected to the output signal line 6 (corresponding to the output signal lines 61 to 6m in FIG. 3). Here, each of the MOS transistors T1 to T6 is a P-channel type transistor.

A signal ØVPS is input into the source of the MOS transistor T2 for the logarithmic transformation. The respective drains of the MOS transistors T3 and T5 are grounded. The source of the MOS transistor T3 is connected to the capacitor C. A reference voltage (i.e., a signal ØVD) for integrating an electric signal from the photodiode PD is input into the capacitor C.

A DC voltage RSB is input into the source of the MOS transistor T4, and further, a signal ØRST is input into the gate of the transistor T4. Furthermore, a signal ØS for turning on or off the transistor T1 is input into the gate of the MOS transistor T1; in contrast, a signal ØV for turning on or off the transistor T6 is input into the gate of the MOS transistor T6.

In the pixel such configured as described above, the constant current source 7 receiving the DC voltage VPS at one end thereof (corresponding to the constant current source 71 to 7m in FIG. 3) is connected to the source of the MOS transistor T5 via the MOS transistor T6 and the output signal line 6.

Consequently, when the MOS transistor T6 is ON, the MOS transistor T5 is operated as a MOS transistor for a source follower, and then, outputs a voltage signal amplified by the constant current source 7 to the output signal line 6.

A source follower circuit is configured in the above-described manner, so that an amplifying circuit for greatly outputting a signal is configured. As a consequence, a signal, which is amplified sufficiently greatly by the amplifying circuit, can be obtained, thereby facilitating the processing in a subsequent signal processing circuit. Moreover, the constant current sources 71 to 7m constituting load resistance portions of the amplifying circuit are not disposed inside of the pixels, but the constant current sources 71 to 7m are respectively disposed in the output signal lines 61 to 6m, to which the plurality of pixels arrayed in a columnar direction are connected. Thus, it is possible to reduce the number of load resistances or constant current sources, so as to reduce the area occupied by the amplifying circuit on a semiconductor chip.

Subsequently, explanation will be first made below on a normal image pickup operation by the above-described image pickup element 10 and a sensitivity variation detecting operation of each of the pixels. Thereafter, a description will be given below of a moving object extraction image pickup operation.

A high or low voltage signal is used as the signal ØVPS to be supplied to the source of the MOS transistor T2 for logarithmic transformation when the normal image pickup mode is achieved. That is to say, a voltage for actuating the transistor T2 in a sub threshold region is set to be low when the video signal and the noise signal caused by variations in sensitivity are read, respectively. When the transistor T2 is reset, a high voltage is adopted to allow a current greater than that when the low signal ØVPS is given to flow in the transistor T2 (see FIG. 4).

In contrast, when the moving object extraction image pickup mode is achieved, a voltage between the low voltage and the high voltage is adopted in place of the high voltage in resetting the transistor T2 (see FIG. 5).

A tertiary voltage signal is adopted as the reference voltage ØVD to be given to the capacitor C in either the normal image pickup mode or the moving object extraction image pickup mode. In other words, a voltage value when the capacitor C is operated to integrate is set to a highest voltage Vh; a voltage value when the video signal is read is set to a voltage Vm lower than the voltage Vh; and a voltage value when the noise signal is read is set to a voltage Vl much lower than the voltage Vm.

Next, explanation will be made below on the image pickup operation in the normal image pickup mode and the image pickup operation in the moving object extraction image pickup mode by the image pickup element 10. In the explanation below, the voltage signal is given to the pixel or the like by the timing generator TG and the voltage regulator Rg in response to an instruction from the controller CONT.

Incidentally, the normal image pickup mode and the moving object extraction image pickup mode may be manually switched by operating the operating unit 20, or may be automatically switched in accordance with an image pickup mode switching schedule which has been previously stored in a semiconductor memory or the like (for example, the normal image pickup mode is set at all times, and the moving object extraction image pickup mode is set for a given period of time at a predetermined time).

<Image Pickup Operation in Normal Image Pickup Mode>

(a) Video Signal (Image Signal) Output

In the explanation below, the signal ØS for turning on or off the MOS transistor T1 is set to be low at all times during the image pickup operation, wherein the transistor T1 is ON. Moreover, the signal ØRST to be given to the transistor T4 for resetting the capacitor is high, wherein the transistor T4 is OFF. The signal ØVPS to be given to the source of the MOS transistor T2 is low in such a manner that the transistor T2 is operated in the sub threshold region, and further, the voltage value of the signal ØVD to be given to the capacitor C is set to Vh, thereby achieving the integrating operation by the capacitor C.

In this state, when light enters into the photodiode PD from a region in which an image is picked up, a photocurrent is generated, so that voltages equivalent to values, which are converted in such a manner that the photocurrent is varied in a naturally logarithmic fashion with respect to an incident light intensity, are generated at the gates of the transistors T2 and T3, respectively, due to the sub threshold characteristics of the transistor T2.

A drain current, which is amplified by the transistor T3, flows from the capacitor C based on the voltage which is varied in the naturally logarithmic fashion with respect to the incident light intensity, and then, the capacitor C electrically discharges. A gate voltage of the MOS transistor T5 becomes a voltage in proportion to a naturally logarithmic value of an integral value of the incident light intensity. In order to read the video signal obtained by the integrating operation by the capacitor C, the voltage value of the signal ØVD is set to Vm, and further, the low pulse signal ØV is given to the MOS transistor T6. Consequently, the source current according to the gate voltage of the MOS transistor T5 flows in the output signal line 6 via the MOS transistor T6.

At this time, since the transistor T5 is operated as a MOS transistor of a source follower type, the video signal appears as the voltage signal on the output signal line 6. Thereafter, the signal ØV is set to be high to turn off the transistor T6, and further, the voltage value of the signal ØVD is set to be Vh. The video signals output via the transistors T5 and T6 in this manner are proportional to the gate voltage of the transistor T5, and thus, it becomes a signal in proportion to a naturally logarithmic value of an integral value of the incident light intensity to the photodiode PD.

(b) Sensitivity Variation Detection (Noise Signal Output)

As illustrated in FIG. 4, when the pulse signal ØVD of the voltage value Vm and the low pulse signal ØV are given to output the video signal, the signal ØVD is set to Vh, and thereafter, the transistor T1 is turned off by setting the signal ØS to be high, and thus, the resetting operation is started. At this time, a positive electric charge flows from the source of the transistor T2, so that negative electric charges accumulated at the gate and drain of the transistor T2 and the gate of the transistor T3 are combined again. Consequently, a potential at the gate and drain of the transistor T2 is increased to some extent.

However, when the potential at the gate and drain of the transistor T2 is increased up to a certain value, the resetting speed of the transistor T2 is reduced. In particular, this tendency becomes prominent in the case where a bright image pickup region abruptly becomes dark. Therefore, the signal ØVPS to be given to the source of the transistor T2 is next made to be high. In this manner, the quantity of positive electric charges flowing from the source of the transistor T2 is increased by increasing the source voltage of the transistor T2, so that the negative electric charges accumulated at the gate and drain of the transistor T2 and the gate of the transistor T3 are speedily combined again. At this time, the signal ØRST is made to be low and the transistor T4 is turned on, thus initializing the voltage of a connection node between the capacitor C and the gate of the transistor T5.

When the potential at the gate and drain of the transistor T2 is further increased by making the signal ØVPS high, the signal ØVPS to be given to the source of the transistor T2 is made to be low, thereby returning the potential of the transistor T2 to the original state. When the state of the potential of the transistor T2 is reset to the original state in this manner, the signal ØRST is made to be high and the transistor T4 is turned off.

And then, the capacitor C performs the integrating operation, so that the voltage of the connection node between the capacitor C and the gate of the transistor T5 becomes a voltage according to the gate voltage of the reset transistor T2. Thus, the pulse signal ØV is given to the gate of the transistor T6, which is then turned on, and further, the voltage value of the signal ØVD is made to be Vl. Consequently, the output current representing the variations in sensitivity of each of the pixels caused by the variations in characteristics of the transistors T2 and T3 flows in the output signal line 6.

At this time, since the transistor T5 is actuated as the MOS transistor of the source follower type, the noise signal appears as a voltage signal in the output signal line 6. Thereafter, the pulse signal ØRST is given to the transistor T4, and then, the voltage of the connection node between the capacitor C and the gate of the transistor T5 is reset. The signal ØS is made to be low, so as to energize the transistor T1, thereby achieving the image pickup operation.

Although in the above description, the voltages ØVD to be given to the capacitor C are set as the three values Vh, Vm and Vl in order to integrate the electric signal obtained by the photoelectric conversion, the voltage ØVD to be given to the capacitor C in order to integrate the electric signal may be a constant value. An offset in the video signal, from which noise is eliminated, can be reduced by adopting the three values as the voltage ØVD. As a consequence, it is possible to effectively utilize the operating range of an analog/digital converter or the like connected to the rear stage of the image pickup element. Incidentally, the voltage value of the signal ØVD to be given to the capacitor C when the video signal is read may be higher than the voltage value which is given at the time of the integration.

Moreover, although each of the pixels is configured by using the P-channel MOS transistor in the above-described image pickup element, each of the pixels may be configured by using an N-channel MOS transistor. At this time, the polarities of the pixels become reverse. In the same manner, the polarities of the constant current sources 71 to 7$m$ disposed in the solid image pickup element become reverse to those illustrated in FIG. 2. The other configuration is substantially similar to that of the image pickup element, described already.

<Image Pickup Operation in Moving Object Extraction Image Pickup Mode>

Operation for outputting a video signal is the same as that in the case of the normal image pickup mode. However, operation for outputting a noise signal is different from that in the case of the normal image pickup mode. That is to say, as shown in FIG. 5, either one of voltage signals v1 and v2 of two kinds of voltage values between high-and low values ($|v1-vL|>|v2-vL|$, where vL represents a voltage value of the signal ØVPS during a not-reset period, i.e., a low voltage value) is used as the signal ØVPS used in the processing of resetting the MOS transistor T2 in place of the high signal ØVPS at the time of the noise signal output in the normal image pickup mode. The use of either one of the voltage signals v1 and v2 will be described later. In this manner, a moving object can be extracted. The other operation is similar to the noise output processing in the normal image pickup mode.

Like in the case of the normal image pickup mode, also in the moving object extraction image pickup mode, a difference between a video signal, which is output from each of the pixels when an image is picked up with a low signal ØVPS, and a noise signal, which is output from each of the pixels when the MOS transistor T2 is reset with the signal ØVPS between high and low values, is subtracted from the video signal by the difference processing by the correcting circuit 9, and then, the resultant signal is output.

However, the voltage signal v1 or v2 having a value between high and low values is used as the signal ØVPS used in the processing of resetting the MOS transistor T2 in place of the high signal ØVPS at the time of the noise signal output in the normal image pickup mode, and therefore, a not-reset portion remains in the MOS transistor T2. Furthermore, the not-reset portion is more frequently generated in the pixel having the great incident light intensity due to the characteristics of the MOS transistor T2; in contrast, it is less generated in the pixel having the small incident light intensity. Consequently, the video signal after the difference processing by the correcting circuit 9 becomes the same value in each of the pixels, in which an image is picked up in an image picked-up region having no variation in luminance. As a result, a signal, which can be displayed at an intermediate density (a substantially uniformly gray density in the monochromatic case) in a still background portion or the like in an image pickup region. This can allow the still background portion or the like to be displayed at an intermediate density.

In the meantime, the luminance of a moving object is varied during a video signal integrating period, for example, from "dark" to "bright", or vice versa.

In the case where the luminance is varied from "dark" to "bright" and the "bright" state is continued until the start of the reset period, the video signal becomes high in comparison with the "bright" state at all times during the integration period. The noise signal becomes a value dependent on only the voltage at an input portion of the integrator circuit at the time of the reset start. Consequently, since the "bright" state is provided at the time of the reset start, the noise signal is the same as that in the "bright" state at all times. Then, the output of the video signal after the difference processing is reduced, so that a portion, in which light incident into the solid image pickup element 10 is varied from "dark" to "bright", can be darkly displayed (it can be displayed in black in the monochromatic case). Moreover, the video signal is low and the noise signal also is low in comparison with the "dark" state at all times. However, the quantity of the reduction of the noise signal is less than that of the video signal, so that the output of the video signal after the difference processing is reduced.

In the case where the luminance is varied from "dark" to "bright" and is varied to "dark", and further, the "dark" state till the start of the reset period, the video signal is reduced in comparison with the "dark" state at all times during the integrating period. Since the noise signal is a value dependent on only the voltage in the input portion of the integrator circuit at the time of the reset start, the "dark" state is provided at the time of the reset start, and therefore, the noise signal is the same as that in the "dark" state at all times. Then, the output of the video signal after the difference processing is increased, so that the light incident into the solid image pickup element 10 is varied from "dark" to "bright", and further, a portion, in which the luminance is varied to "dark", can be displayed brightly (it can be displayed in white in the monochromatic case).

For the same reason, in the case where the luminance is varied from "bright" to "dark", the output of the video signal after the difference processing is increased, a portion, in which the luminance is varied, can be displayed brightly.

In the case where the luminance is varied from "bright" to "dark", and further, is varied to "bright", the output of the video signal after the difference processing is decreased, and thus, a portion, in which the luminance is varied, can be displayed darkly.

The above-described phenomenon allows the portion, in which the incident light is varied, to be extracted, whereby the existence of the moving object can be detected.

The image pickup element 10 is set in the moving object extraction image pickup mode, and then, the image pickup region including a moving object is picked up, to be then displayed on a display. In this case, for example, an image illustrated in FIG. 6(B) is displayed. FIG. 6(A) illustrates that a black ball is moved leftward in the drawing in front of a white wall. The luminance of a left edge of the ball is varied from "bright" to "dark" due to the leftward movement when it is viewed from the image pickup element 10, and thus, it is displayed as a bright portion P. In contrast, the luminance of a right edge of the ball is varied from "dark" to "bright" due to the leftward movement when it is viewed from the image pickup element 10, and thus, it is displayed as a dark portion Q. In this manner, the moving object is extracted.

Figure 7:
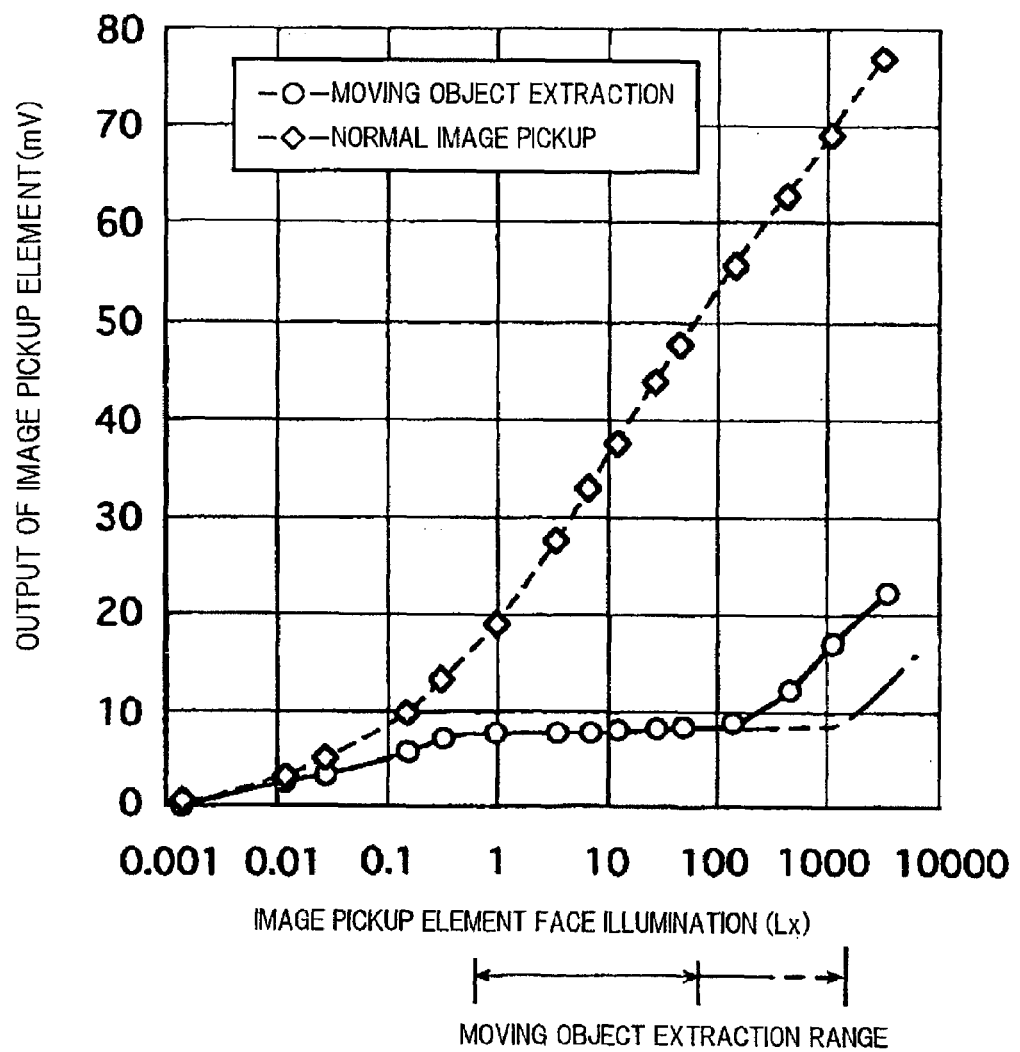
FIG. 7 is a graph illustrating photoelectric conversion characteristics in the moving object extraction image pickup mode of a solid image pickup element.

Here, in examining the photoelectric conversion characteristics of the image pickup element 10 in the moving object extraction image pickup mode, it is found that the element output becomes almost constant within an object luminance range of an element face illumination of about 0.3 lux to 150 lux, as illustrated in FIG. 7. This shows that the difference between the video signal and the noise signal is constant when the object luminance falls almost within this range (i.e., about 0.3 lux to 150 lux), wherein a still object is not picked up while the moving object can be extracted.

In contrast, when the object luminance is out of the above-described luminance range, the element output is not constant, as illustrated in FIG. 7. This shows that the difference between the video signal and the noise signal is not constant, wherein not only the moving object but also a still object are picked up. In particular, the difference between the video signal and the noise signal is not constant on a high illumination side (a high luminance side as to the object), and therefore, not only the moving object but also the still object are picked up in the case of a bright object (i.e., a bright image pickup region).

When the voltage value VPSH of the signal ØVPS, the gate voltage VG and the threshold voltage Vth when the MOS transistor T2 is reset satisfy the relationship of VPSH−VG<Vth, the moving object extraction image pickup is construed to be achieved. In the case where the luminance of the object is relatively low, the gate voltage VG becomes large, so that the relationship of VPSH−VG<Vth is satisfied, thereby achieving the moving object extraction image pickup. In contrast, if the luminance of the object is too high, the gate voltage VG becomes small, and therefore, the relationship of VPSH−VG<Vth is not satisfied, thereby making the moving object extraction image pickup impossible. In view of this, when the luminance of the object is high, the relationship of VPSH−VG<Vth is satisfied by decreasing the voltage value VPSH of the signal ØVPS, shortening the reset period, that is, the applying period of the voltage value VPSH of the signal ØVPS so as to increase the gate voltage VG, or taking the above two methods.

Incidentally, in the case of the N-channel MOS transistor, when the reset voltage VPSL, the gate voltage VG and the threshold voltage Vth when the transistor is reset satisfy the relationship of VG−VPSL<Vth, the moving object extraction image pickup is achieved.

The present preferred embodiment is designed such that one of the signals having the plurality of kinds of voltage values between the high and low values can be used as the signal ØVPS for use in the processing of resetting the MOS transistor T2 in place of the high signal ØVPS at the time of the noise signal output in the normal image pickup mode, as described above. Specifically, either one of the voltage signals v1 and v2 having the two kinds of voltage values can be used. The plurality of reset voltages have been previously stored in a ROM in the computer in the controller CONT, and thus, the reset voltage signal suitable for the moving object extraction image pickup is used according to the luminance range of the object.

In the present preferred embodiment, an output from the output amplifier Am is read per given timing measured by an inside timer in the controller CONT in the moving object extraction image pickup mode, and the luminance of the object is measured based on the output. When the luminance of the object falls within the luminance range of the normal object whose luminance is assumed (hereinafter referred to as "a low luminance range"), the controller CONT instructs the voltage regulator Rg in such a manner that the voltage v1 having the not-reset portion of the transistor as the reset voltage is reduced, in other words, a high reset level is applied. In contrast, when the luminance is higher than the luminance range of the normal object (hereinafter referred to as "a high luminance range") and a region having a luminance value, in which it clearly seems to be out of the moving object extraction image pickup region, is included in the object, the controller CONT instructs the voltage regulator Rg in such a manner that the voltage v2 having the not-reset portion of the transistor is increased, in other words, a low reset level is applied. In this manner, the moving object extraction image pickup can be achieved within a wide luminance range in the present image capturing apparatus. A threshold value of the object luminance representing the boundary between the low luminance range and the high luminance range also has been previously stored in the ROM in the controller CONT.

Here, the reset voltage v2 is a voltage, at which the moving object extraction image pickup can be achieved with respect to an object having a luminance of a double or more upper value, with respect to an upper value of the object luminance range, in which the moving object extraction image pickup can be achieved at the reset voltage v1.

Incidentally, the object luminance may be determined by obtaining an average luminance of the entire object.

Figure 8:
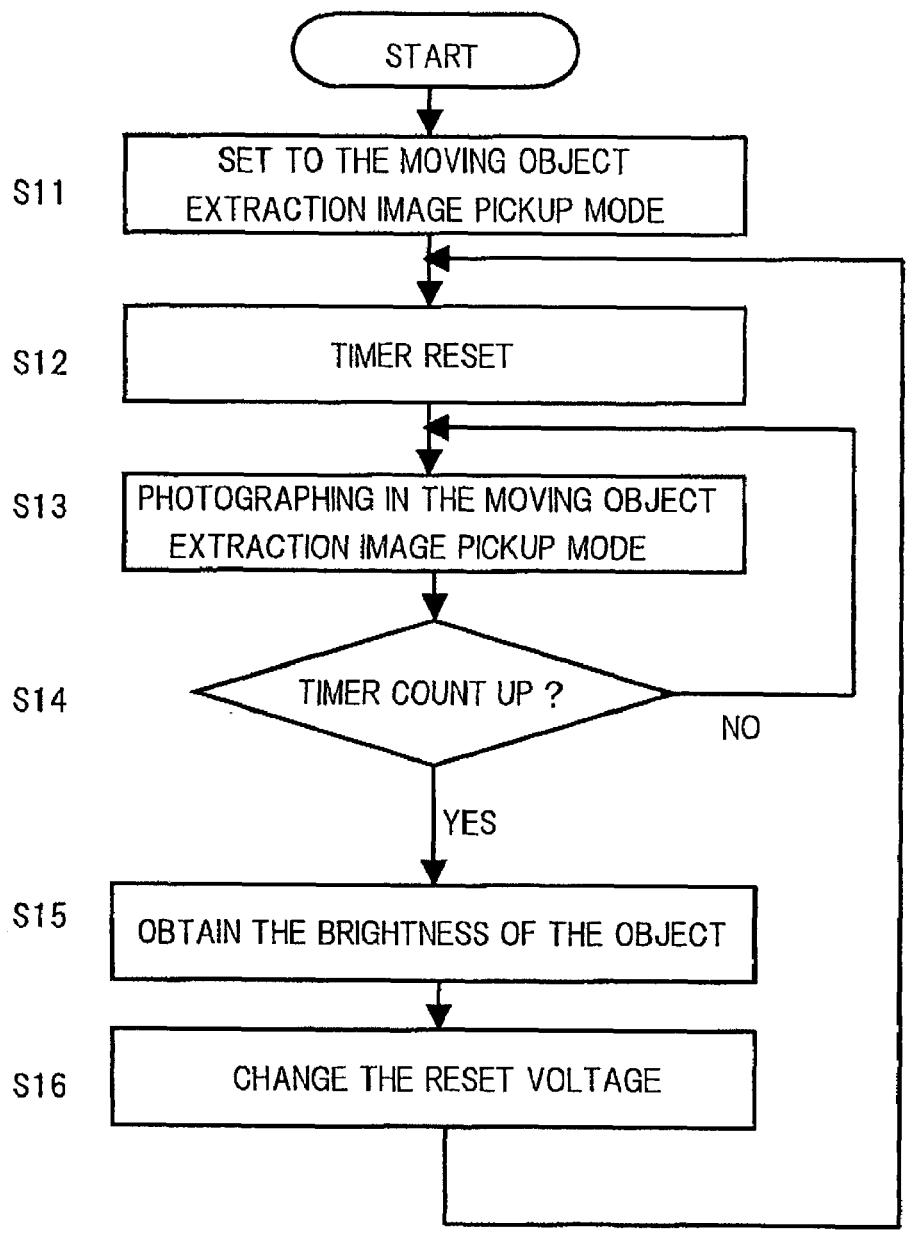
FIG. 8 is a flowchart illustrating a part of operation of a control unit of the image capturing apparatus illustrated in FIG. 1.

FIG. 8 is a flowchart illustrating the processing which is executed in the moving object extraction image pickup mode by the controller CONT.

As illustrated, upon start of a program, the image pickup element 10 is set to the moving object extraction image pickup mode (step S11), the inside timer is reset (S12), and then, the object is photographed in the moving object extraction image pickup mode (S13). During this time, the output from the amplifier Am is read in. Thereafter, when the inside timer is counted up (S14), the brightness (i.e., the luminance) of the object is obtained based on data read from the amplifier Am (S15). When the obtained luminance falls within the low luminance range and the reset voltage currently set is v1, the reset voltage v1 is maintained as it is, and then, the program returns to step S12 (S16). In contrast, when the object includes the luminance portion falling within the high luminance range, the reset voltage is varied to v2, and then, the program returns to step S12. Here, the initial reset voltage at the time of the start of the program is v1.

According to the image capturing apparatus in the present preferred embodiment, the luminance of the object (i.e., the image pickup region) is periodically obtained per timing counted by the inside timer, so that the luminance of the object falls within the low luminance range at the beginning of the moving object extraction image pickup, and further, the moving object extraction image pickup can be achieved even if some high luminance object enters in the image pickup region on the way.

(2) Modification of Image Capturing Apparatus A

The above-described controller CONT may perform the processing below in the moving object extraction image pickup mode.

Figure 9:
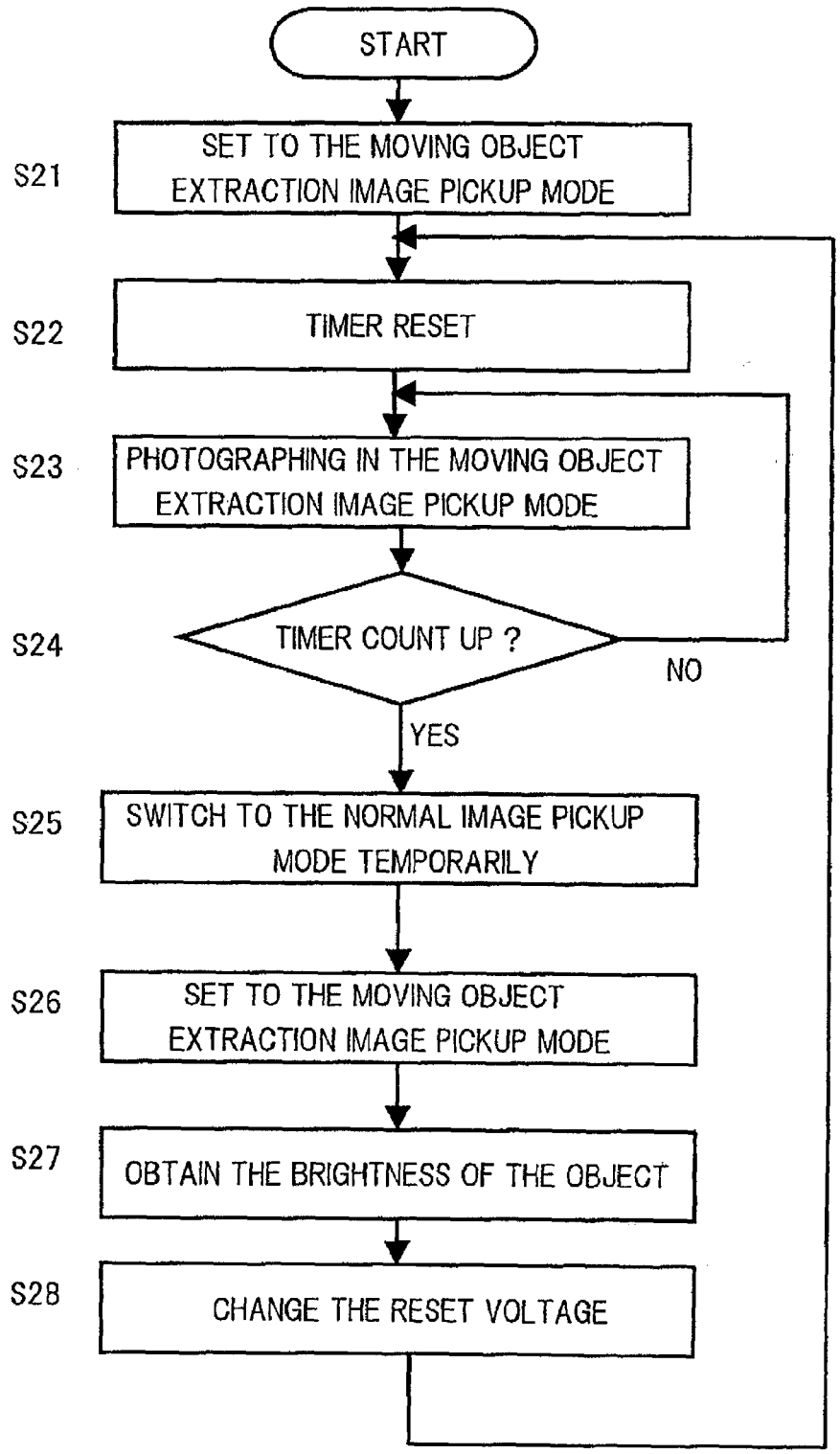
FIG. 9 is a flowchart illustrating a part of operation of a control unit of the image capturing apparatus illustrated in FIG. 1 in a modification.

That is to say, as illustrated in FIG. 9, upon start of a program, the image pickup element 10 is set to the moving object extraction image pickup mode (step S21), the inside timer is reset (S22), and then, the object is photographed in the moving object extraction image pickup mode (S23). Thereafter, when the inside timer is counted up (S24), the image pickup mode is temporarily switched to the normal image pickup mode for a predetermined period of time (S25). While the normal image pickup mode is set, the output from the amplifier Am is read in. Thereafter, the image pickup mode is switched again to the moving object extraction image pickup mode (S26), and then, the brightness (i.e., the luminance) of the object is obtained based on data read from the amplifier Am (S27). When the obtained luminance falls within the low luminance range and the reset voltage currently set is v1, the reset voltage v1 is maintained as it is, and then, the program returns to step S22 (S28). In contrast, when the object includes the luminance portion falling within the high luminance range, the reset voltage is varied to v2, and then, the program returns to step S22. Here, the initial reset voltage at the time of the start of the program is v1.

In this manner, although the image pickup mode need be switched once to the normal image pickup mode, the object luminance can be accurately grasped. As a result, the reset level in the moving object image pickup mode can be appropriately set. Here, the average luminance of the entire object may be determined.

In the operation illustrated in FIG. 8 or 9, the controller CONT obtains the object luminance in step S15 or step S27; compares the object luminance range, in which the moving object extraction image pickup can be achieved, with the obtained luminance at the reset voltage v1 or v2 currently set (in other words, at the current reset level); and maintains the current reset voltage when the luminance falls within the luminance range, in which the moving object extraction image pickup can be achieved. In contrast, when the luminance falls out of the luminance range, in which the moving object extraction image pickup can be achieved, the current reset voltage v1 (or v2) may be switched to the reset voltage v2 (or v1).

Additionally, in the image capturing apparatus A, although the different voltages v1 and v2 are used as the reset voltage for resetting the transistor T2 for the logarithmic transformation in the moving object extraction image pickup mode, the reset voltage may be used as described below.

(1) As illustrated in FIG. 10(A), as for the moving object extraction image pickup of the object (the image pickup region) within the low luminance range, the reset voltage v1 having the small not-reset portion of the transistor T2 for the logarithmic transformation, in other words, the high reset level is used. In contrast, as for the moving object extraction image pickup of the object within the high luminance range, a reset voltage v21 (whose voltage value is equal to that of the reset voltage v1) having the large not-reset portion of the transistor T2, in other words, the low reset level for the voltage-applying period shorter than that of the voltage v1 is used.

(2) As illustrated in FIG. 10(B), as for the moving object extraction image pickup of the object (the image pickup region) within the low luminance range, the reset voltage v1 is used. In contrast, as for the moving object extraction image pickup of the object within the high luminance range, a reset voltage v22 (whose voltage value is smaller than that of the reset voltage v1) having the large not-reset portion of the transistor T2, in other words, the low reset level for the voltage applying period shorter than that of the voltage v1 is used.

(3) As illustrated in FIG. 10(C), as for the moving object extraction image pickup of the object (the image pickup region) within the low luminance range, a reset voltage v1' (whose voltage value is larger than that of the reset voltage v1) for the voltage applying period shorter than that of the voltage v1, that is, the small not-reset portion of the transistor T2 (the high reset level) is used. In contrast, as for the moving object extraction image pickup of the object within the high luminance range, a reset voltage v23 having the same voltage value as that of the reset voltage v1' for the voltage applying period shorter than that of the voltage v1', that is, the large not-reset portion of the transistor T2 (the low reset level) is used.

In FIG. 10, t represents the applying period of the reset voltage in the normal image pickup mode.

Moreover, three or more reset levels may be provided, and among them, a reset voltage value or a reset period suitable for the object luminance may be selected. Otherwise, a reset voltage value or a reset period corresponding to the luminance may be calculated in accordance with a predetermined arithmetic formula, to be thus adjusted continuously.

Although the reset voltage of the transistor T2 for the logarithmic transformation in the moving object extraction image pickup mode in the above-described image capturing apparatus is automatically selected according to the object luminance, it may be manually selected via the operating unit 20.

(3) Image Capturing Apparatus B

Figure 11:
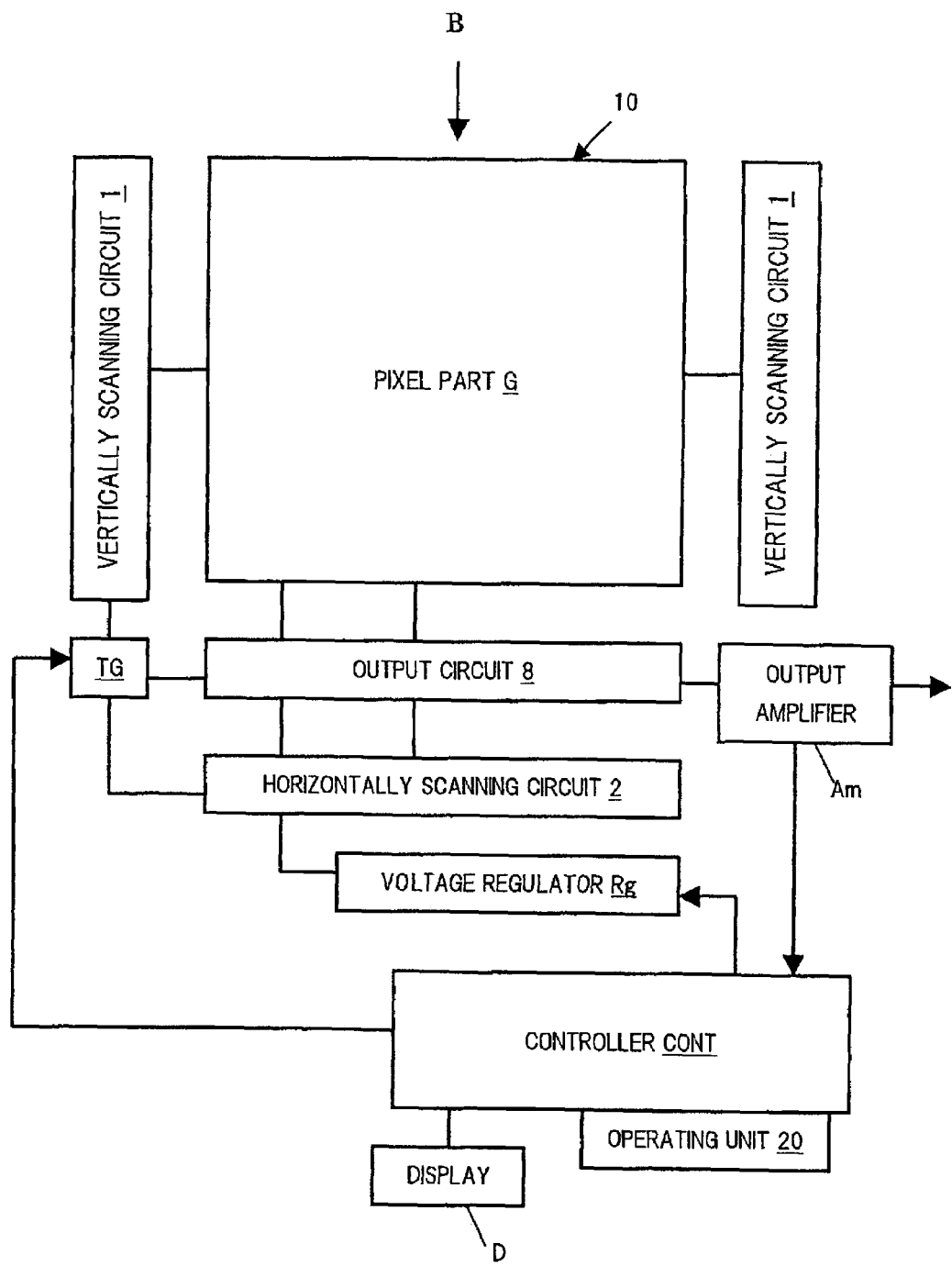
FIG. 11 is a block diagram illustrating another configuration of an image capturing apparatus.

FIG. 11 is a block diagram illustrating the image capturing apparatus in another preferred embodiment. Like the image capturing apparatus A, an image capturing apparatus B comprises a solid image pickup element 10, a voltage regulator Rg and a controller CONT' constituted of mainly a computer.

The solid image pickup element 10 and the voltage regulator Rg are the same as those in the image capturing apparatus A. An output from an output amplifier Am in the solid image pickup element 10 is input into the controller CONT'. A timing generator TG connected to the solid image pickup element 10 is operated in response to an instruction given by the controller CONT', and further, controls an applying period of various kinds of applying voltages to pixels.

The voltage regulator Rg supplies predetermined various kinds of voltage signals or the like to a pixel portion G or the like based on an instruction from the controller CONT'. Moreover, the voltage regulator Rg controls voltage values of the various kinds of applying voltages to the pixels based on an instruction from the controller CONT'.

Also in the image capturing apparatus B, the solid image pickup element 10 can switch an image pickup mode between a normal image pickup mode and a moving object extraction image pickup mode manually based on an instruction from an operating unit 20' connected to the controller CONT' or in accordance with a predetermined schedule. Incidentally, it is understood that the image pickup element 10 should be used exclusively in the moving object extraction image pickup mode.

Also in the image capturing apparatus B, high and low voltage signals are used as a signal ØVPS to be supplied to a source of a MOS transistor T2 for logarithmic transformation when the normal image pickup mode is achieved. When the moving object extraction image pickup mode is achieved, a reset voltage for the moving object extraction image pickup is applied to the source of the transistor T2 when the transistor T2 is reset. The reset voltage for the moving object extraction image pickup can be selected according to an object luminance in the operating unit 20' connected to the controller CONT'.

The reset voltage for the moving object extraction image pickup, which can be selected in the operating unit 20', is a voltage (FIG. 12(B)) having a voltage value (an absolute value) smaller than a half of a voltage value of a high reset voltage (FIG. 12(A)) to be applied to the source of the transistor T2 for logarithmic transformation in the normal image pickup mode and/or a voltage (FIG. 12(C)) having a voltage applying period shorter than that of the reset voltage in the normal image pickup mode. FIG. 12(D) illustrates a reset voltage having a voltage value smaller than the half and having a voltage applying period shorter than an applying time t in the normal image pickup mode.

In the image capturing apparatus B, an appropriate one among the voltage having the voltage value (the absolute value) smaller than the half of that of the high reset voltage for the normal image pickup, the voltage having the shorter voltage applying period and the voltage having the voltage value (the absolute value) smaller than the half of that of the high reset voltage for the normal image pickup and the shorter voltage applying period is selected as the reset voltage for the moving object extraction image pickup according to the object luminance by the operation via the operating unit 20', thereby achieving the moving object extraction image pickup. In selecting the voltage, either one or both of a change quantity vm of the voltage value from a low voltage to be applied to the source of the transistor T2 for the logarithmic transformation to the reset voltage for the moving object extraction image pickup and a reset voltage applying period vt for the moving object extraction image pickup can be adjusted in order to obtain the video signal.

The selection and adjustment of the reset voltage for the moving object extraction image pickup according to the object luminance can be achieved by, for example, adjusting at least either one of the change quantity vm and the applying period vt in such a manner that the moving object extraction image pickup can be performed even at a maximum luminance in consideration of the assumed maximum luminance of the object in the environment, in which the image capturing apparatus B is actually used. In the present preferred embodiment, the output from the amplifier Am is input into the controller CONT', which then calculates the maximum luminance or average luminance of the object based on the input data, thereby displaying the luminance on a display D. Consequently, the reset voltage for the moving object extraction image pickup can be adjusted while monitoring displayed information on the object luminance.

Otherwise, the relationship between various kinds of object luminances which can allow the moving object extraction and the adjustment width of the change quantity vm and the applying period vt has been previously obtained by experiments, and then, a correspondence table has been created. The reset voltage may be adjusted in accordance with the correspondence table.

Alternatively, the reset voltage for the moving object extraction image pickup may be adjusted at the time of the fabrication of the image capturing apparatus B in consideration of, for example, the general object luminance. In this case, a user may re-adjust the reset voltage in the operating unit 20'.

Although the present invention has been fully described by way of examples with reference to the accompanying drawings, it is to be noted that various change and modifications will be apparent to those skilled in the art. Therefore, unless otherwise such changes and modifications depart from the scope of the present invention, they should be construed as being including therein.

What is claimed is:

1. An image capturing apparatus comprising:
a solid image pickup element including a photosensitive element and a transistor for logarithmic transformation, in which an output signal from the photosensitive element is input into a first electrode, for outputting a signal, which is logarithmically varied with respect to an incident light intensity to the photosensitive element; and
a voltage controller for controlling a voltage to be applied to a second electrode of the transistor,
wherein the voltage controller applies a first reset voltage to the second electrode, so as to reset the transistor in such a manner that the image capturing apparatus is operated in a state of moving object extraction image pickup, and
wherein the first reset voltage is a voltage for resetting the transistor in one reset level selected from a plurality of reset levels of the transistor.

2. An image capturing apparatus according to claim 1, wherein said voltage controller varies at least one of a voltage value and an applying time of the first reset voltage, so as to vary the reset level.

3. An image capturing apparatus according to claim 1, further comprising a detector for detecting the luminance of the object, wherein said voltage controller varies the reset level according to the object luminance detected by the detector.

4. An image capturing apparatus according to claim 3, wherein said voltage controller decreases the reset level as the object luminance detected by the detector is greater.

5. An image capturing apparatus according to claim 4, wherein said voltage controller decreases the reset level by decreasing a change quantity of the voltage value with respect to the first reset voltage.

6. An image capturing apparatus according to claim 4, wherein said voltage controller decreases the reset level by shortening an applying time of the first reset voltage.

7. An image capturing apparatus according to claim 3, further comprising a calculator for determining a luminance range in which an image can be picked up in the moving object extraction image pickup state achieved at the reset level set at the preceding time,
wherein said voltage controller compares the luminance range calculated by said calculator with the object luminance detected by said detector, so as to vary the reset level based on the comparison result.

8. An image capturing apparatus according to claim 1, wherein said voltage controller further applies a second reset voltage to the second electrode, so as to reset the transistor to a normal image pickup state.

9. An image capturing apparatus according to claim 8, further comprising a timer for counting a predetermined time after the start of the moving object extraction image pickup state,
wherein said voltage controller applies the second reset voltage to the second electrode in order to return to the normal image pickup state when the timer counts up the predetermined time.

10. An image capturing apparatus according to claim 1, further comprising an operating member for manually varying the reset level.

11. An image capturing apparatus according to claim 1, wherein said plurality of reset levels include two reset levels which are different double or more in upper limit of the object luminance, at which the moving object extraction image pickup is achieved.

12. An image capturing apparatus comprising:
a solid image pickup element including a photosensitive element and a transistor, in which an output signal from the photosensitive element is input into a first electrode, for outputting a signal; and
a voltage controller for controlling a voltage to be applied to a second electrode of the transistor,
wherein the voltage controller applies a first reset voltage to the second electrode, so as to reset the transistor in such a manner that the image capturing apparatus is operated in a state of moving object extraction image pickup, and
wherein a voltage change quantity in applying the first reset voltage is smaller than a half of a voltage change quantity required for resetting the transistor in such a manner that the image capturing apparatus is operated in a normal image pickup state.

13. An image capturing apparatus according to claim 12, wherein said voltage controller further applies a second reset voltage to the second electrode, so as to reset the transistor to a normal image pickup state.

14. An image capturing apparatus according to claim 12, wherein solid image pickup element outputs the signal which is logarithmically varied with respect to an incident light intensity to the photosensitive element when the image capturing apparatus is operated in the normal image pickup state.

15. An image capturing apparatus comprising:
- a solid image pickup element including a photosensitive element and a transistor, in which an output signal from the photosensitive element is input into a first electrode, for outputting a signal; and
- a voltage controller for controlling a voltage to be applied to a second electrode of the transistor,
- wherein the voltage controller applies a first reset voltage to the second electrode, so as to reset the transistor in such a manner that the image capturing apparatus is operated in a state of moving object extraction image pickup, and
- wherein a period of time, during which the first reset voltage is applied, is shorter than a reset time required for resetting the transistor in such a manner that the image capturing apparatus is operated in a normal image pickup state.

16. An image capturing apparatus according to claim 15, wherein said voltage controller further applies a second reset voltage to the second electrode, so as to reset the transistor to a normal image pickup state.

17. An image capturing apparatus according to claim 15, wherein solid image pickup element outputs the signal which is logarithmically varied with respect to an incident light intensity to the photosensitive element when the image capturing apparatus is operated in the normal image pickup state.

18. An adjusting method for an image capturing apparatus provided with a solid image pickup element having pixels, including a photosensitive element and a transistor for receiving an output signal from the photosensitive element and outputting a signal, comprises the steps of:
- calculating a reset condition of the transistor in order to achieve a moving object extraction image pickup at a luminance higher than an upper limit value within an assumed object luminance range; and
- resetting the transistor in the calculated reset condition.

19. An adjusting method according to claim 18, wherein said reset condition is reset voltage applied to said transistor.

20. An adjusting method according to claim 18, wherein said reset condition is an applying time of the reset voltage applied to said transistor.

21. An adjusting method according to claim 18, wherein solid image pickup element outputs the signal which is logarithmically varied with respect to an incident light intensity to the photosensitive element.

* * * * *